3,023,120
PLASTIC COATED, FLUOROCARBON RESIN-IM-
PREGNATED GLASS FIBER CLOTH TAPE AND
METHOD OF MAKING THE SAME
Robert Goldsmith, Great Notch, and Paul S. Hess, West
Orange, N.J., assignors to General Dispersions Incor-
porated, Passaic, N.J., a corporation of New Jersey
Filed Aug. 25, 1958, Ser. No. 756,789
7 Claims. (Cl. 117—15)

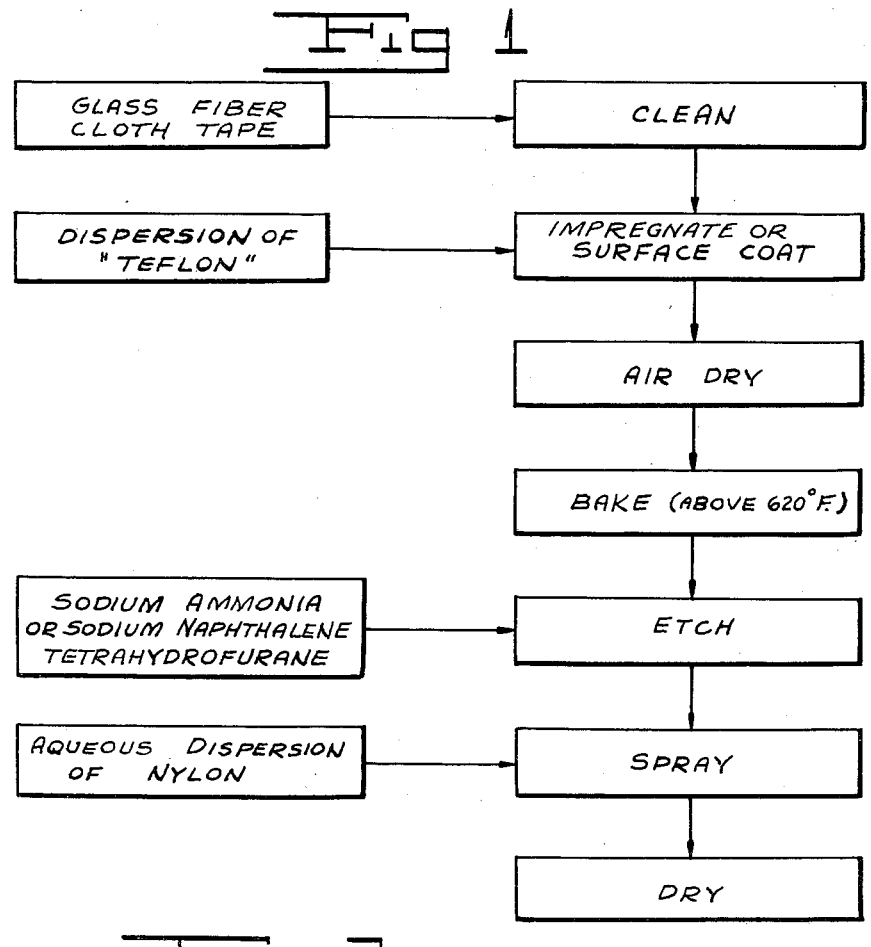
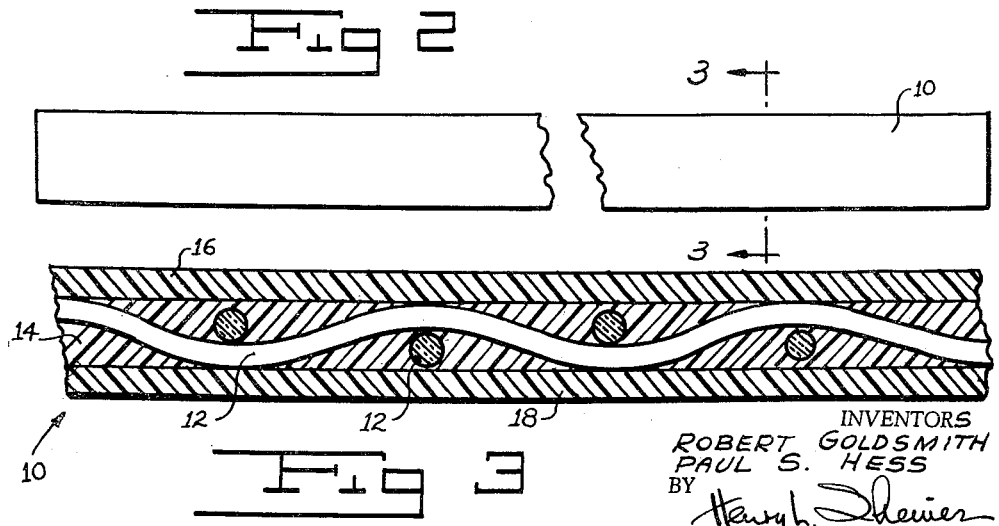

Our invention relates to a plastic coated, fluorocarbon resin-impregnated glass cloth fiber tape and method of making the same and, more particularly to a glass fiber cloth tape which has been impregnated with "Teflon," which is a brand of polymerized tetrafluoroethylene sold by E. I. du Pont de Nemours and Company, and then coated with nylon, and a method of making the same.

In many instruments the display of the indication has been by means of an elongated tape. In some instruments the tapes move upwardly and downwardly. It has been attempted to use a ribbon of metal such as stainless steel or beryllium copper. These metal tapes had a high noise level and have proven to be unsatisfactory. Attempts have also been made to employ tapes made of films of polyethylene terephthalate resin. (This material is sold by E. I. du Pont de Nemours and Company under the trademark "Mylar.") It was found that the "Mylar" tape was unsatisfactory for a display in instruments owing to deformation under operating conditions and distortion under static conditions when subjected to the wide variations in temperatures encountered in the environment to which some of the instruments were subjected. Both the metal tapes and the plastic tapes of the prior art presented great difficulty in the obtaining of satisfactory joints or welds of the ends of the tape. The tapes were usually employed as endless belts by sealing or joining the two ends to one another.

One object of our invention is to provide a tape or endless belt which may be employed in tape instrumentation at temperatures between −70° C. to +150° C. without distortion.

Another object of our invention is to provide an improved tape for tape instrumentation which may be readily and expeditiously formed into an endless belt by heat-sealing the ends.

Another object of our invention is to provide a tape for tape instrumentation which may be conveniently and expeditiously marked, printed, or silk screened or the like in a convenient and expeditious manner.

Another object of our invention is to provide a tape for tape instrumentation which will have a low noise level.

Still another object of our invention is to provide a tape for tape instrumentation which is translucent so that the characters upon the tape may be read either by direct or back-lighting.

A further object of our invention is to provide a novel method of making tape according to our invention.

Other and further objects of our invention will appear from the following description:

In general our invention contemplates the impregnation of a cloth tape made of glass fibers with "Teflon." Substantially nothing will adhere to "Teflon" and it cannot therefore be printed. We etch the "Teflon" surface and coat it with nylon. The nylon serves two purposes. It enables characters to be printed on the tape without which the tape would have no utility, and it enables the ends of the tape to be rapidly and expeditiously heat-sealed in such a manner that the seal will be flexible and strong. The nylon coating also protects the tape surface and makes it abrasion-resistant.

In the accompanying drawings which form part of the instant specification and which are to be read in conjunction therewith and in which like reference numerals are used to indicate like parts in the various views:

FIGURE 1 is a diagrammatic view illustrating the steps of our novel process.

FIGURE 2 is a top plan view of a tape made in accordance with our process.

FIGURE 3 is a fragmentary sectional view drawn on a greatly enlarged scale, taken along the line 3—3 of FIGURE 2.

More particularly, referring now to the drawings, a tape made of glass fiber cloth is first cleaned. The cloth may have any desired weave and have any suitable width depending on the width desired in the instrumentation in which the finished tape is to be used. The glass fibers may be very fine having an average fiber diameter of ten microns if great flexibility is necessary. Glass fiber diameters of large dimensions may be employed in cases where less flexibility is required. If it is not clean, there may be difficulty in having the "Teflon" adhere to the surface of the glass fibers and thus the tape will not be adequately impregnated. We may clean the glass fiber cloth by subjecting it to trichloroethylene vapors. Following this, we may heat the tape to temperatures in the vicinity of 625° F. for a period sufficiently long to remove the volatiles after degreasing. This heating may take as long as two or three days. It is understood, of course, that if we are able to purchase degreased clean glass fiber cloth tape, we may omit the cleaning step.

We then impregnate or surface-coat the clean glass fiber cloth tape with "Teflon." To do this, we form a dispersion of "Teflon" which, as we pointed out above, is tetrafluoroethylene copolymer. Any appropriate concentration of "Teflon" may be employed. In general, a heavy concentration will produce a thicker coating or impregnation, while a lighter concentration will produce a thinner coating or impregnation. The thickness of the coating with the four pounds per gallon of "Teflon" will produce a coating between .5 and 1.5 mils depending on atmospheric conditions and temperature. Any desired thickness of "Teflon" may be employed. We usually prefer to employ a thickness of the "Teflon" coating in the vicinity of two mils. The "Teflon" dispersion may be applied to the tape in any appropriate manner. Usually we dip the tape into the dispersion, employing a solids content of about two pounds per gallon. During the dipping we maintain the dispersion in an agitated state in order that it be of uniform viscosity during the dipping step. The dipped glass fiber cloth tape is air-dried for about an hour after dipping in order to remove moisture. It may be heated slightly to below the boiling point of water to accelerate the evaporation of moisture. The moisture evaporation step can also be carried on at sub-atmospheric pressures if desired. After the tape has been air-dried, it is baked at a temperature above 620° F. for about one-half hour. The baking time will vary depending on the condition of the baking oven. With a concentration of solids of about two pounds per gallon, a coating in the vicinity of 0.25 mil will be obtained. In order to get a thicker coat, we repeat the dipping, air-drying and baking steps in order to build up the "Teflon" coating. The thickness of the coating will depend on the fineness of the weave of the glass fiber cloth. The coating must be of sufficient thickness to cover irregularities produced by the weaving. After a smooth external surface is achieved, it will be found that the "Teflon"-impregnated glass fiber cloth will have a smooth waxy surface. Nothing appears to adhere to "Teflon" and it cannot be printed by conventional methods of which we have any knowledge.

In order to prepare the "Teflon"-impregnated glass fiber cloth tape for its coating of nylon, we etch its surface so that the nylon will stick to it. This is done by subjecting the "Teflon"-coated tape to the action of a dilute solution of metallic sodium and liquid ammonia. The solution may be formed by incorporating 1.4 percent by weight of metallic sodium in liquid ammonia at −33° C. The "Teflon" surface may also be etched by subjecting it to the action of sodium naphthalene tetrahydrofurane. Any other suitable etching step may be practiced.

After the surface is etched, we then spray the surface with an aqueous dispersion of nylon. By nylon we mean that group of synthetic plastics which are long-chain polymer amides. The amide groups form an integral part of the main polymer chain, which have the characteristic that when formed into a filament the structural elements are oriented in the direction of the axis. Nylon may be produced by the reaction of the adipic acid and hexamethylene-diamene. We may employ nylon sold under the trade name of "Zytel" by E. I. du Pont de Nemours and Company and form aqueous dispersions in accordance with the method disclosed in the copending application Serial No. 547,095 of Paul S. Hess for "Method of Making Aqueous Dispersions of Nylon," now Patent No. 2,951,054.

The nylon dispersion may be applied to the etched "Teflon"-impregnated glass fiber cloth tape by spraying, dipping, or the like. It is understod that the "Teflon"-impregnated glass fiber cloth tape may be coated either on one side or on both sides. Generally, we prefer to coat the tape with nylon to a thickness of about .5 mil. It is understood, of course, that any desired color can readily be obtained by incorporating the desired pigment with the nylon as is well understood by those skilled in the art. The nylon coating provides a surface which is highly resistant to abrasion and which can easily be printed by methods well-known in the art. Advantageously also, the nylon coating can be rapidly and expeditiously heat-sealed to itself at a temperature in the vicinity of 310° F. The nylon coating can be air-dried in any appropriate manner. In general, we prefer to carry on the drying process rapidly at temperatures above the boiling point of water.

The tape can then be printed by any appropriate method such as silk screening, hot foil stamping, or the like. After printing we can, if we desire, coat the finished tape with a light coat of nylon by means of an aqueous dispersion and permit this finishing coat to dry as before.

Referring now to FIGURE 2, we have shown a tape 10 which is indicated generally by this reference numeral in FIGURE 3. The glass fiber cloth 12 is impregnated with "Teflon" 14 and the tape there shown is coated with nylon coatings 16 and 18 on both sides.

It will be understood, of course, that our tape may be perforated by standard perforating instruments used in the film industry if a perforated tape is desired in instrumentation. Such perforation should be performed before the nylon coating step.

Endless belts formed by heat-sealing tape of our material exhibit great strength at the joint. Lap joints may be made either vertically to the tape or at an angle, if desired. We have found that an overlap of only 0.04 inch will give a joint of great strength and flexibility. A tape .625 inch in width, having a heat-sealed lap joint of this dimension was subjected to a tensile test. The tape was only 3 mils thick and had a tensile strength of 30 pounds. The failure, however, did not occur at the seal which indicated that the seal was stronger than the rest of the tape.

We have tested tapes under all sorts of conditions we would encounter in instrument procedures. In one test we found no deterioration of either the tape or the seal joint or to the legibility of the imprinted characters after over 1000 hours of testing at speeds of four times that normally encountered in actual use. There was no abrasion where tapes passed over pulleys or where one portion of the tape contacted another in the instruments.

The amount of expansion of the tape to the degree of rise in temperature under those conditions indicate that we may expect less than .000001 inch elongation per degree F. per pound. Perfect elasticity has been observed up to the breaking point. This indicates that under relaxed conditions after long use under load, the total tape length will be identical to that initially supplied. Our tape has been successfully tested at vertical tape instrumentation at temperatures between −70° C. to +150° C. without distorting. It is noiseless in operation.

If we desire to avoid the development of static electrical charges, we may incorporate graphite into our aqueous dispersion of nylon. Using about 20 percent graphite based on the weight of nylon in the dispersion, we were able to obtain a coating 1 mil in thickness having a resistance of 2,000,000 ohms per foot in a tape having a width of .625 inch. In this test only one side of the tape was coated. With a coating of 2 mil thickness, the resistance of nylon coating containing graphite was reduced to 360,000 ohms per linear foot. In instruments where it is desired to avoid static charges completely, a nylon coating having graphite incorporated therein can be employed.

It will be seen that we have accomplished the objects of our invention. We have provided a tape which may be employed in tape instrumentation at temperatures between −70° C. to +150° C. without distortion and which may be readily and expeditiously formed into an endless belt by heat-sealing the ends. Our tape may be conveniently and expeditiously marked, printed, or silk screened even though it employs "Teflon." Our tape will have a low noise level in instruments, and characters can be read either by direct or back-lighting.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. A tape comprising cloth formed of glass fibers covered with polymerized tetrafluoroethylene and having disposed thereon a layer of nylon.

2. A tape comprising a length of glass fiber cloth impregnated with polymerized tetrafluoroethylene and coated with nylon.

3. A tape as in claim 2 having characters imprinted thereon said characters being covered with a final coating of nylon.

4. A method of forming a plastic coated, fluorocarbon resin-impregnated glass fiber cloth tape including the steps of etching a polymerized tetrafluoroethylene impregnated glass fiber cloth tape, spraying an aqueous dispersion of nylon on said etched surface, and drying the dispersion to form a coating of nylon on the surface.

5. A method of forming a plastic coated, fluorocarbon resin-impregnated glass fiber cloth tape including the steps of coating a length of glass fiber cloth tape with a dispersion of polymerized tetrafluoroethylene, permitting the polymerized tetrafluoroethylene dispersion to air-dry, baking the dried polymerized tetrafluoroethylene at a temperature of above 620° F. to fuse the polymerized tetrafluoroethylene into a homogeneous coating, etching the coating, spraying the etched polymerized tetrafluoroethylene coating with an aqueous dispersion of nylon and then drying the nylon dispersion.

6. A method of forming a plastic coated, fluorocarbon resin-impregnated glass fiber cloth tape including the steps of coating a length of glass fiber cloth tape with a dispersion of polymerized tetrafluoroethylene, permitting the polymerized tetrafluoroethylene dispersion to air-dry, baking the dried polymerized tetrafluoroethylene at a temperature of above 620° F. to fuse the polymerized tetrafluoroethylene into a homogeneous coating, etching the polymerized tetrafluoroethylene coating with an etching agent selected from the class consisting of a solution of sodium in ammonia and sodium naphthalene tetrahydrofurane, spraying the etched polymerized tetrafluoroethylene coating with an aqueous dispersion of nylon and then drying the nylon dispersion.

7. A method of forming a plastic coated, fluorocarbon resin-impregnated glass fiber cloth tape including the steps of cleaning the glass fiber cloth tape, surface-coating the clean tape with a dispersion of polymerized tetrafluoroethylene, air-drying the polymerizing tetrafluoroethylene coat, baking the polymerized tetrafluoroethylene coat above 620° F. to fuse the polymerized tetrafluoroethylene into a homogeneous coating, etching the polymerized tetrafluoroethylene coating with an etching agent selected from the class consisting of a solution of sodium in ammonia and sodium naphthalene tetrahydrofurane, spraying the etched polymerized tetrafluoroethylene coating with an aqueous dispersion of nylon and drying the nylon dispersion upon the polymerized tetrafluoroethylene surface.

References Cited in the file of this patent

UNITED STATES PATENTS

| | | |
|---|---|---|
| 2,562,117 | Osdal | July 24, 1951 |
| 2,668,157 | Emig et al. | Feb. 2, 1954 |
| 2,714,097 | Watson et al. | July 26, 1955 |
| 2,765,241 | Wayne | Oct. 2, 1956 |
| 2,789,063 | Purvis et al. | Apr. 16, 1957 |
| 2,911,328 | Goldsmith | Nov. 3, 1959 |